US009229981B2

(12) United States Patent
Eblighatian et al.

(10) Patent No.: US 9,229,981 B2
(45) Date of Patent: Jan. 5, 2016

(54) SMART QUERY PLAN WITH VISUAL OPTIMIZATIONS TO IMPROVE RESPONSIVENESS

(71) Applicant: International Business Machines Corporation, Armonk, NY (US)

(72) Inventors: Aram B. Eblighatian, East Greenwich, RI (US); Niraj P. Joshi, Cary, NC (US); Lakshminarayanan Srinivasan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/964,209

(22) Filed: Aug. 12, 2013

(65) Prior Publication Data
US 2015/0046429 A1 Feb. 12, 2015

(51) Int. Cl.
*G06F 17/30* (2006.01)
*G06F 3/0485* (2013.01)

(52) U.S. Cl.
CPC ........ *G06F 17/30463* (2013.01); *G06F 3/0485* (2013.01)

(58) Field of Classification Search
CPC .................... G06F 17/30463; G06F 3/0485
USPC ........................................................ 707/718
See application file for complete search history.

(56) References Cited

U.S. PATENT DOCUMENTS

| | | | |
|---|---|---|---|
| 6,763,359 B2 * | 7/2004 | Lohman et al. | 707/718 |
| 7,185,004 B1 * | 2/2007 | Simmen et al. | |
| 7,783,625 B2 * | 8/2010 | Simmen | 707/713 |
| 7,890,491 B1 * | 2/2011 | Simmen | 707/713 |
| 8,209,322 B2 * | 6/2012 | Ahmed | 707/714 |
| 2003/0182276 A1 * | 9/2003 | Bossman et al. | 707/3 |
| 2004/0181521 A1 * | 9/2004 | Simmen | 707/3 |
| 2005/0091199 A1 * | 4/2005 | Focazio et al. | 707/3 |
| 2006/0095406 A1 * | 5/2006 | Bestgen et al. | 707/3 |
| 2006/0167865 A1 * | 7/2006 | Andrei | 707/4 |
| 2008/0114718 A1 * | 5/2008 | Anderson et al. | 707/2 |
| 2008/0133454 A1 * | 6/2008 | Markl et al. | 707/2 |
| 2008/0140622 A1 * | 6/2008 | Bestgen et al. | 707/3 |
| 2008/0147598 A1 * | 6/2008 | Nica | 707/2 |
| 2008/0189288 A1 * | 8/2008 | Barsness et al. | 707/10 |
| 2008/0235393 A1 * | 9/2008 | Kunjithapatham et al. | 709/236 |
| 2008/0250010 A1 * | 10/2008 | Rathod et al. | 707/5 |
| 2009/0043728 A1 * | 2/2009 | Barsness et al. | 707/2 |
| 2009/0077013 A1 * | 3/2009 | Hu et al. | 707/2 |

(Continued)

OTHER PUBLICATIONS

Markl, Volker, et al., "MAXENT: Consistent Cardinality Estimation in Action", SIGMOD 2006, Chicago, IL, Jun. 27-29, 2006, pp. 775-777.*

*Primary Examiner* — Robert Stevens
(74) *Attorney, Agent, or Firm* — Jordan IP Law, LLC

(57) ABSTRACT

Methods and systems may provide for identifying one or more visualization characteristics of a user interface (UI) associated with an application on a client device and generating a query plan based on the one or more visualization characteristics, a historical performance of a network infrastructure and a current status of the network infrastructure. In addition, a response to a query from the application may be generated in accordance with the query plan. In one example, generating the query plan includes selecting a number of elements in a responsive data set and/or selecting one or more of a plurality of service endpoints in the network infrastructure to handle the query based at least in part on the one or more visualization characteristics.

20 Claims, 3 Drawing Sheets

(56) References Cited

U.S. PATENT DOCUMENTS

| | | |
|---|---|---|
| 2009/0083232 A1 | 3/2009 | Ives et al. |
| 2010/0114868 A1* | 5/2010 | Beavin et al. ................ 707/718 |
| 2010/0318495 A1* | 12/2010 | Yan et al. ...................... 707/618 |
| 2012/0166446 A1* | 6/2012 | Bowman et al. .............. 707/743 |
| 2012/0173485 A1 | 7/2012 | Kothule et al. |
| 2012/0331052 A1* | 12/2012 | Rathod .......................... 709/204 |
| 2013/0159286 A1* | 6/2013 | Macho et al. ................. 707/718 |

* cited by examiner

SMART QUERY PLAN WITH VISUAL OPTIMIZATIONS TO IMPROVE RESPONSIVENESS

BACKGROUND

Embodiments of the present invention generally relate to the processing of data queries. More importantly, embodiments relate to smart query plans having visual optimizations to improve responsiveness.

In a wide variety of enterprises, multiple queries may be submitted simultaneously from users of devices for information regarding the enterprise in question. Indeed, the proliferation of smart phones, smart tablets and other mobile devices may have led to increased usages with regard to enterprise queries. For example, in a software deployment enterprise, a relatively high volume of mobile queries for historical data and/or real-time data (e.g., deployment status, inventories, resources) may be processed by a large network infrastructure containing multiple service endpoints in different geographic locations. Difficulties may be encountered in quickly fetching responsive data in such an environment without overloading the infrastructure. Moreover, the underlying systems of the network infrastructure may be designed to handle worst case scenarios, which may in turn be wasteful of resources in off peak time periods.

BRIEF SUMMARY

Embodiments may include a computer program product having a computer readable storage medium and computer usable code stored on the computer readable storage medium. If executed by a processor, the computer usable code may cause a computer to identify one or more visualization characteristics of a user interface (UI) associated with an application on a client device. The computer usable code, if executed, may also cause a computer to generate a query plan based on the one or more visualization characteristics, a historical performance of a network infrastructure and a current status of the network infrastructure. Additionally, the computer usable code, if executed, may cause a computer to generate a response to a query from the application in accordance with the query plan.

Embodiments may also include a computer program product having a computer readable storage medium and computer usable code stored on the computer readable storage medium. If executed by a processor, the computer usable code may cause a computer to identify one or more visualization characteristics of a user interface (UI) associated with an application on a client device, wherein the one or more visualization characteristics are to include a number of elements of a data view of the UI. The computer usable code, if executed, may also cause a computer to receive a query from the application and generate a query plan based on the one or more visualization characteristics, a historical performance of a network infrastructure and a current status of the network infrastructure, wherein the historical performance is to include one or more of a response time of one or more individual service points in the network infrastructure, a composite response time, a network latency, a functional profile of two or more similar service endpoints, and a re-query attempt history. Additionally, the computer usable code, if executed, may cause a computer to select a number of elements in a responsive data set for the query plan based at least in part on the one or more visualization characteristics, wherein the number of elements in the responsive data set is to be less than a full result size. The computer usable code, if executed, may also cause a computer to select one or more of a plurality of service endpoints in the network infrastructure for the query plan based at least in part on the one or more visualization characteristics, and generate a response to the query in accordance with the query plan.

Embodiments may also include a computer implemented method in which one or more visualization characteristics of a user interface (UI) associated with an application on a client device are identified. The method may also provide for receiving a query from the application and generating a query plan based on the one or more visualization characteristics, a historical performance of a network infrastructure and a current status of the network infrastructure, wherein the historical performance includes one or more of a response time of one or more individual service points in the network infrastructure, a composite response time, a network latency, a functional profile of two or more similar service endpoints, and a re-query attempt history. Additionally, the method may provide for selecting a number of elements in a responsive data set for the query plan based at least in part on the one or more visualization characteristics, wherein the number of elements in the responsive data set is less than a full result size. The method may also provide for selecting one or more of a plurality of service endpoints in the network infrastructure for the query plan based at least in part on the one or more visualization characteristics, and generating a response to the query in accordance with the query plan.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
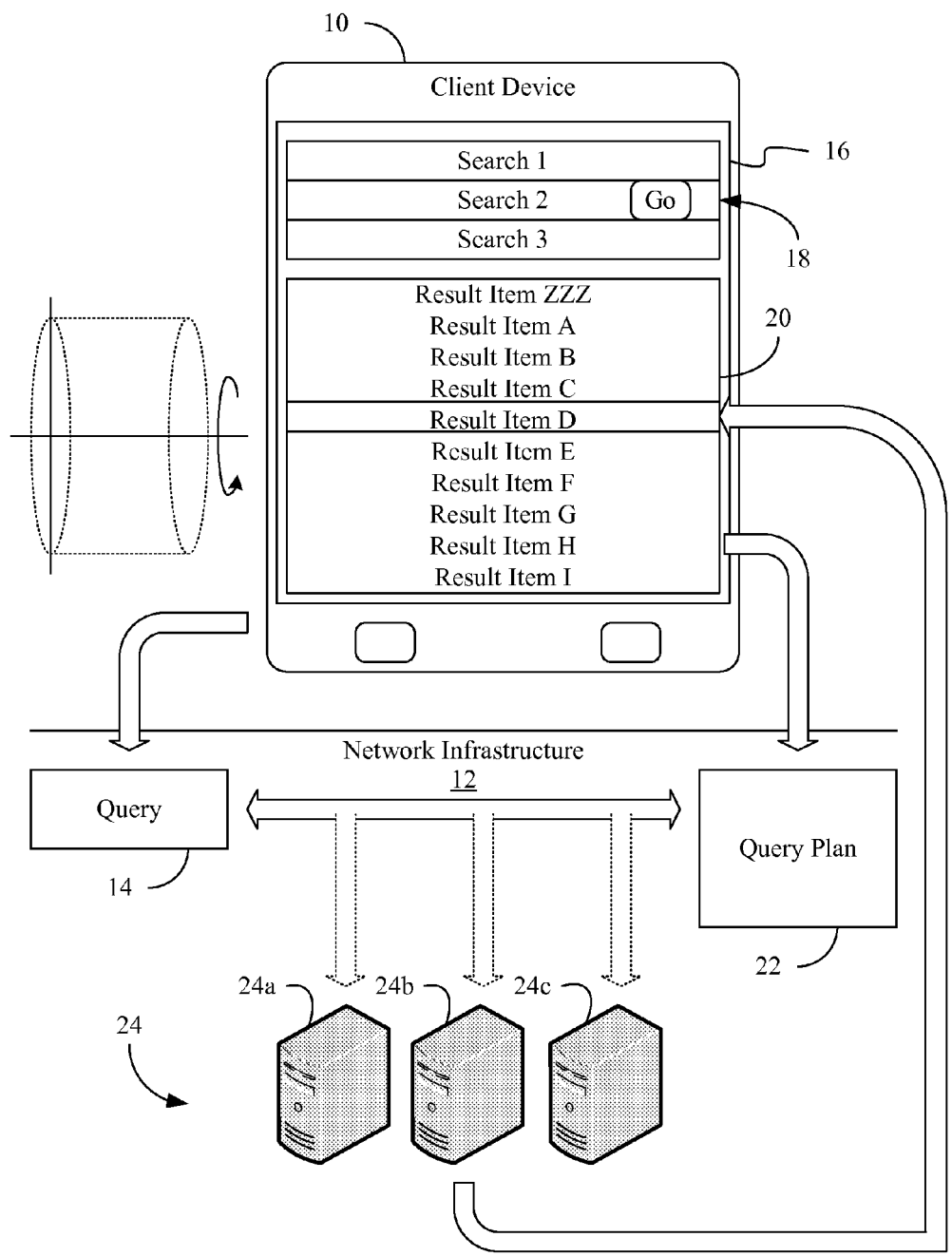
FIG. 1 is a block diagram of an example of a query from a client device to a networking infrastructure according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to FIG. 1, an interaction between a client device 10 and a network infrastructure 12 is shown in which an application on the client device 10 issues a query 14 to the network infrastructure 12. The query 14 may request information regarding an enterprise such as, for example, a software development and/or deployment enterprise, an electronic commerce (e-commerce) enterprise, a manufacturing enterprise, a governmental entity, and so forth, wherein the requested information might include deployment status information, inventory information, resource information, etc., in a historical and/or real-time context. The illustrated network infrastructure 12 includes a plurality of service endpoints 24 (24a-24c) that may be configured to translate the language of the query 14 into higher level forms (e.g., SQL), access underlying data repositories to retrieve responsive data, perform operations on the responsive data, and so forth.

In the illustrated example, the client device 10 runs an application that presents a user interface (UI) 16 (e.g., via a liquid crystal display/LCD, touch screen, etc.) to an individual operating the client device 10 in conjunction with the generation of the query 14. For example, the UI 16 may include a menu 18 of search options (e.g., "Search 1", "Search 2", "Search 3") from which the individual/user may select in order to initiate the query 14. The UI 16 may also present the results of the query to the user via a data view 20. If the client device 10 is a mobile device such as, for example, a smart phone, smart tablet, etc., with a relatively small form factor, the data view 20 may be structured as a bi-directional "spinner" interface that displays the responsive data set as a circular/cylindrical list of items that may be scrolled either upward or downward (e.g., via finger swipe on touch screen, finger and/or cursor movement of a scroll button, etc.) in order to view the items in the responsive data set.

Of particular note is that the small form factor of the client device 10 and/or the display-related constraints of the data view 20 may be relevant to the processing of the query 14 by the network infrastructure 12. As will be discussed in greater detail, using one or more visualization characteristics of the UI 16 to generate a query plan 22 for the query 14 may improve the responsiveness and overall performance of the network infrastructure 12. The visualization characteristics of the UI 16 may be communicated to the network infrastructure 12 in the query 14 or via another suitable mechanism such as, for example, a separate communication, device profile, user preference settings, etc.

Figure 2:
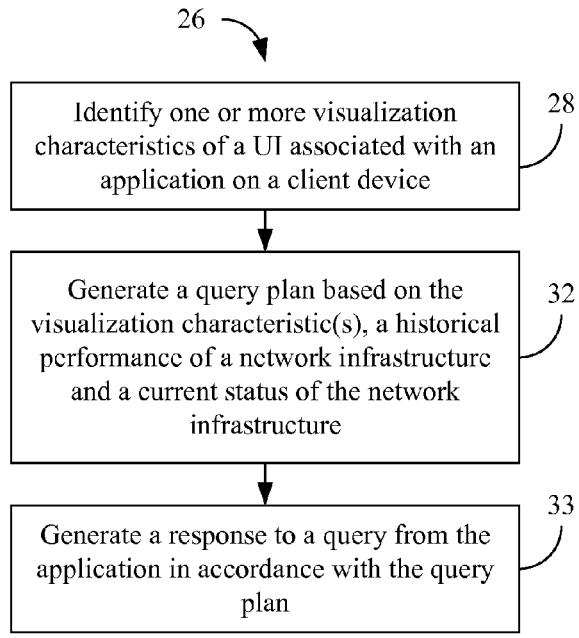
FIG. 2 is a flowchart of an example of a method of processing queries according to an embodiment.
Figure 3:
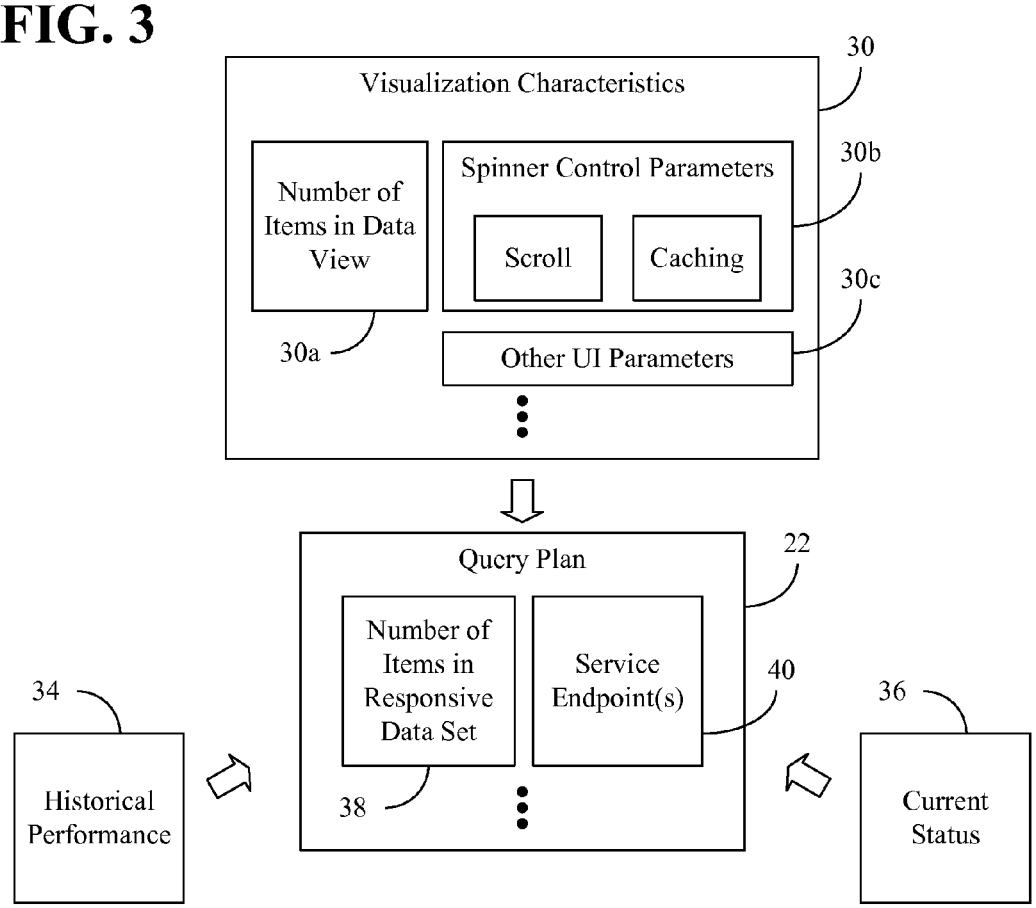
FIG. 3 is a block diagram of an example of a set of visualization characteristics and a query plan according to an embodiment.

FIG. 2 shows a method 26 of processing queries such as, for example, the query 14 (FIG. 1). With continuing reference to FIGS. 2 and 3, illustrated processing block 28 provides for identifying one or more visualization characteristics 30 (30a-30c) of a UI associated with an application on a client device. The visualization characteristics 30 might include, for example, the number of elements 30a in the data view of the UI (e.g., based on display size, device orientation and font size), one or more spinner control parameters 30b, and so forth. Example spinner control parameters 30b include, but are not limited to, scroll parameters (e.g., upward scroll capability and/or distance, downward scroll capability and/or distance), cache parameters (e.g., the number of screens to be cached), and so forth. The illustrated visualization characteristics 30 also include other UI parameters 30c such as, for example, scrollable list parameters (e.g., vertical, horizontal, oblique, etc.), scrollable table parameters, scrollable graph parameter and/or map parameters (e.g., three dimensional/3D), etc.

A query plan 22 may be generated at block 32 based on the visualization characteristics 30, a historical performance 34 (e.g., response time of individual service endpoints, composite response time, network latency, functional profile of two or more similar service endpoints, re-query attempt history, etc.) of the network infrastructure, a current status 36 (e.g., load of individual service endpoints, processor utilization of individual service endpoints, etc.) of the network infrastructure, and so forth. The illustrated query plan 22 includes the number of items 38 to be included in the responsive data set, a selection of service endpoints 40 to handle the query, and so forth. Illustrated block 33 provides for generating a response to a query from the application in accordance with the query plan.

Of particular note is that the number of items 38 to be included in the responsive data set may be constrained to be less than the full result size based on the visualization characteristics 30. For example, if the display size, orientation and font size of the client device originating the query indicates that, for example, the number of items 30a in the data view is ten and the cache parameter of the spinner control parameters 30b indicates that five screens worth of data are to be cached to support spinner scrolling, the number of items 38 to be included in the responsive data set may defined as fifty (5×10) even though the full result size might be much greater (e.g., 500 items). Reducing the responsive data set based on the visualization characteristics 30 may enable the selection of service endpoints to be better tailored to the specific display constraints of the requesting client device. For example, a query having a smaller responsive data set might be assigned to a service endpoint having relatively low processing resources and high availability (e.g., due to low utilization and/or high networking bandwidth) rather than another service endpoint having relatively high processing resources and low availability (e.g., due to outage/failure, high utilization and/or low networking bandwidth). Such an approach can significantly improve the responsiveness of the network infrastructure to queries.

Figure 4:
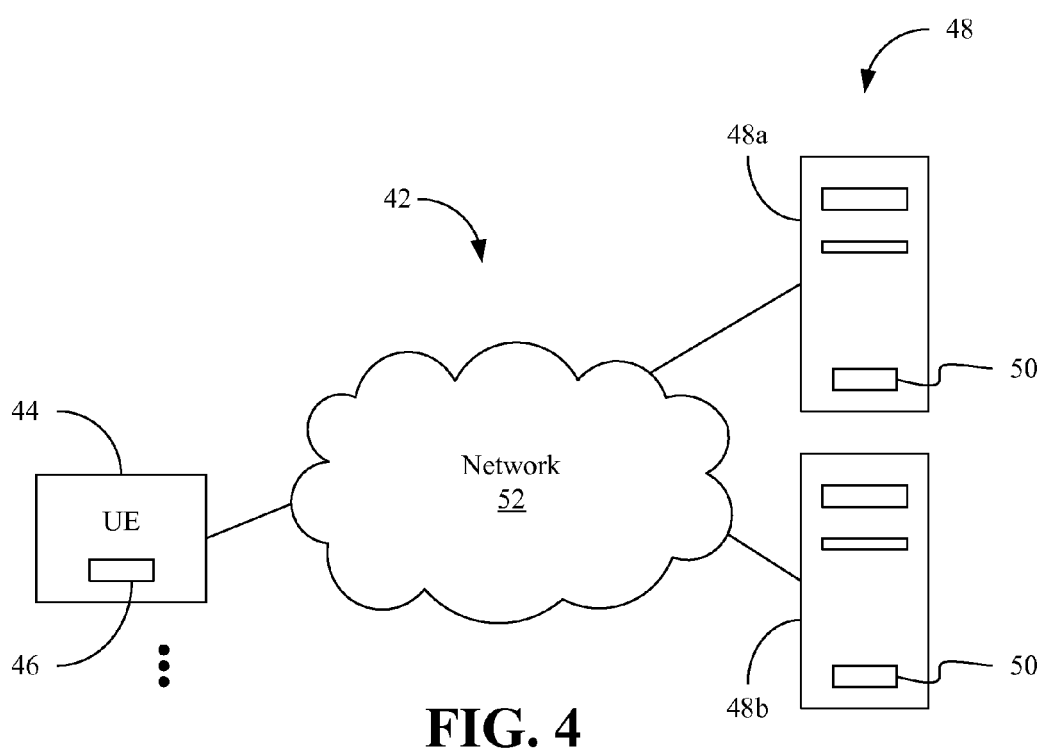
FIG. 4 is a block diagram of an example of a networking architecture according to an embodiment.

FIG. 4 shows a networking architecture 42 in which a user equipment (UE) device 44 such as the client device 10 (FIG. 1) includes an application 46 configured to issues queries that are handled by one or more service endpoints 48 (48a, 48b) of a network infrastructure. In the illustrated example, the service endpoints 48 include logic 50 to generate query plans and/or balance their processing workload according to the query plans as discussed with regard to the method 26 (FIG. 2). The query plans may also be generated by another component of the network infrastructure such as, for example, a centralized or distributed server (not shown). The service endpoints 48 may communicate with one another and/or the UE device 44 via a network 52. The network 52 can itself include any suitable combination of servers, access points, routers, base stations, mobile switching centers, public switching telephone network (PSTN) components, etc., to facilitate communication between the UE device 44 and service endpoints 48.

In one example, the logic 50 may identify one or more visualization characteristics of a UI associated with the application 46 and generate query plans based on the one or more visualization characteristics, a historical performance (e.g., response time of individual service endpoints, composite response time, network latency, functional profile of two or more similar service endpoints, re-query attempt history, etc.) of the network infrastructure and a current status (e.g., load of individual service endpoints, processor utilization of individual service endpoints, etc.) of the network infrastructure. As already noted, the visualization characteristics may include, for example, one or more of a spinner control parameter, a scrollable list parameter, a scrollable table parameter, a scrollable graph parameter, a scrollable map parameter, and so forth. The logic 50 may also generate responses to queries from the application 46 in accordance with the query plans, wherein the visualization characteristics of the UI may be communicated to the logic 50 via the query, a separate communication, device profile, user preference settings, etc., as already discussed. Although only a single UE device 44 is shown, a relatively large number (e.g., thousands) of UE devices 44 may simultaneously issue queries for processing by the service endpoints 48.

Techniques described herein may therefore reroute queries between service endpoints based on presentation characteristics, UI constraints, etc., in order to optimize performance. Accordingly, query responses may be tailored to mobile interaction and consumption without encountering difficulties in quickly fetching responsive data or overloading the infrastructure. In addition, any need to design the underlying systems of the network infrastructure to handle worst case scenarios may be obviated and resource management may in turn be optimized.

The pseudocode below shows one approach to processing queries as described herein, although other approaches may also be used.

```
ifExistsLoad(user_credential) else seekUserCredential( ) -> user_credential
ifExistsLoad(retry_thresh_hold) -> retry_thresh_hold
For given credential :-
ifExistsLoad(endpoints_connection_info) else seekEndPointsInfo( ) - > update
endpoints_connection info
    update_retry_thresh_hold(endpoints_connection_info)      ->      update
retry_thresh_hold
    ifExistsLoad(historical_Report_data) -> historical_report_data
    ifExistsLoad(historical_performance_data) -> historical_performance_data
    checkAccessibilityTo(endpoints_connection_info)              ->
Array[Endpoint,Availability,Time_for_successful_login_validation]
    setEndPointAffinities(Array[Report],historical_performance_data,historical_
Report_data) {
    }
    For given User Chosen Report_Rp and Instance_n :-
    fetchReport(Report_Rp) {
       Each Array[Query_q] in Seqence_s for Report_Rp {
```

```
        getQueryAffinity(Query_q) -> Array[enpoint_order]
        getCurrentEnterpriseData(Query_q,Array[endpoint_order],)
        Loop session_and_timeout_retry( ) {
            if (failure in[retry_thresh_hold]) {
                setCallBack(callBackHandler*,Query_q)        ->
setFailureInfo(endpoints_connection_info) -> update
    endpoints_connection_info
            } else break;
        }
    }
    update_retry_thresh_hold(endpoints_connection_info)      -
>retry_thresh_hold
        if   time_Query_q_for_Result_Size(2*PI*   N    *   L)   better   than
history_of_last_besttime_Query_q_for Result_Size(2*PI* N * L) to
        where
            N — Number of Screens of Info to be cached
            L — List size on Screen
        then
            reAssignServerAffinitiesAndQuerySeqence(Array[performance_data_for_
Query_q] -> Seqence_s of Array[Query_q]
    }
    callBackHandler(Query_q) {
    On Error_Result -> setFailureInfo(endpoints_connection_info) -> update
endpoints_connection_info
    On       Success_Result       ->      current_report_data_for_Query_q,
current_performance_data_for_Query_q
    Update_UI(current_report_data_for_Query_q,historical_report_data_for_Que
ry_q) Asyncronously
    setHistory(historical_report_data)
    setHistory(historical_performance_data)
    }
    reAssignServerAffinitiesAndQuerySeqence(Array[performance_data_for_Qu
ery_q]) {
    if RA_n - QA_n (via E1) is faster than
        RA_m - QA_m (via E2)
    then
        allocate the QA to target E1
    } -> Seqence_s of Array[Query_q]
```

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product comprising:

a non-transitory computer readable storage medium; and computer usable code stored on the non-transitory computer readable storage medium, where, if executed by a processor, the computer usable code causes a computer to:

identify one or more visualization characteristics of a user interface (UI) associated with an application on a client device, wherein the one or more visualization characteristics are to include a number of elements in a data view of the UI;

receive a query from the application;

generate a query plan based on the one or more visualization characteristics, a historical performance of a network infrastructure and a current status of the network infrastructure, wherein the historical performance is to include one or more of a response time of one or more individual service endpoints in the network infrastructure, a composite response time, a network latency, a functional profile of two or more similar service endpoints, and a re-query attempt history;

select a number of elements in a responsive data set for the query plan based at least in part on the one or more visualization characteristics, wherein the number of elements in the responsive data set is to be less than a full result size;

select one or more of a plurality of service endpoints in the network infrastructure for the query plan based at least in part on the one or more visualization characteristics; and generate a response to the query in accordance with the query plan.

2. The computer program product of claim 1, wherein the computer usable code, if executed, causes a computer to identify one or more of a spinner control parameter, a scrollable list parameter, a scrollable table parameter, a scrollable graph parameter and a scrollable map parameter of the UI as a visualization characteristic.

3. The computer program product of claim 2, wherein the spinner control parameter is to include a scroll parameter.

4. The computer program product of claim 2, wherein the spinner control parameter is to include a cache parameter.

5. The computer program product of claim 4, wherein the cache parameter is to identify a number of screens to be cached on the client device.

6. A computer implemented method, comprising:
identifying one or more visualization characteristics of a user interface (UI) associated with an application on a client device, wherein the one or more visualization characteristics include a number of elements in a data view of the UI;
receiving a query from the application;
generating a query plan based on the one or more visualization characteristics, a historical performance of a network infrastructure and a current status of the network infrastructure, wherein the historical performance includes one or more of a response time of one or more individual service endpoints in the network infrastructure, a composite response time, a network latency, a functional profile of two or more similar service endpoints, and a re-query attempt history;
selecting a number of elements in a responsive data set for the query plan based at least in part on the one or more visualization characteristics, wherein the number of elements in the responsive data set is less than a full result size;
selecting one or more of a plurality of service endpoints in the network infrastructure for the query plan based at least in part on the one or more visualization characteristics; and
generating a response to the query in accordance with the query plan.

7. The method of claim 6, wherein identifying the one or more visualization characteristics includes identifying one or more of a spinner control parameter, a scrollable list parameter, a scrollable table parameter, a scrollable graph parameter and a scrollable map parameter of the UI.

8. The method of claim 7, wherein the spinner control parameter includes a scroll parameter.

9. The method of claim 7, wherein the spinner control parameter includes a cache parameter.

10. The method of claim 9, wherein the cache parameter identifies a number of screens to be cached on the client device.

11. A computer program product comprising:
a non-transitory computer readable storage medium; and
computer usable code stored on the non-transitory computer readable storage medium, where, if executed by a processor, the computer usable code causes a computer to:
identify one or more visualization characteristics of a user interface (UI) associated with an application on a client device;
generate a query plan based on the one or more visualization characteristics, a historical performance of a network infrastructure and a current status of the network infrastructure; and
generate a response to a query from the application in accordance with the query plan.

12. The computer program product of claim 11, wherein the computer usable code, if executed, causes a computer to select one or more of a plurality of service endpoints in the network infrastructure for the query plan based at least in part on the one or more visualization characteristics.

13. The computer program product of claim 11, wherein the computer usable code, if executed, causes a computer to select a number of elements in a responsive data set for the query plan based at least in part on the one or more visualization characteristics.

14. The computer program product of claim 13, wherein the number of elements in the responsive data set is to be less than a full result size.

15. The computer program product of claim 11, wherein the computer usable code, if executed, causes a computer to identify a number of elements in a data view of the UI as a visualization characteristic.

16. The computer program product of claim 11, wherein the computer usable code, if executed, causes a computer to identify one or more of a spinner control parameter, a scrollable list parameter, a scrollable table parameter, a scrollable graph parameter and a scrollable map parameter of the UI as a visualization characteristic.

17. The computer program product of claim 16, wherein the spinner control parameter is to include a scroll parameter.

18. The computer program product of claim 16, wherein the spinner control parameter is to include a cache parameter.

19. The computer program product of claim 18, wherein the cache parameter is to identify a number of screens to be cached on the client device.

20. The computer program product of claim 11, wherein the historical performance is to include one or more of a response time of one or more individual service endpoints, a composite response time, a network latency, a functional profile of one or more similar service endpoints, and a re-query attempt history.

* * * * *